United States Patent
Chen et al.

(10) Patent No.: US 10,306,437 B2
(45) Date of Patent: May 28, 2019

(54) SMART DEVICE GROUPING SYSTEM, METHOD AND APPARATUS

(71) Applicant: XIAOMI INC., Beijing (CN)

(72) Inventors: Hong Chen, Beijing (CN); Weiguang Jia, Beijing (CN); Enxing Hou, Beijing (CN)

(73) Assignee: XIAOMI INC., Beijing (CN)

( * ) Notice: Subject to any disclaimer, the term of this patent is extended or adjusted under 35 U.S.C. 154(b) by 138 days.

(21) Appl. No.: 15/257,214

(22) Filed: Sep. 6, 2016

(65) Prior Publication Data

US 2017/0142538 A1 May 18, 2017

(30) Foreign Application Priority Data

Nov. 17, 2015 (CN) .......................... 2015 1 0789757

(51) Int. Cl.
*H04B 17/318* (2015.01)
*H04L 12/28* (2006.01)
(Continued)

(52) U.S. Cl.
CPC ............ *H04W 4/70* (2018.02); *H04B 17/318* (2015.01); *H04L 12/2803* (2013.01);
(Continued)

(58) Field of Classification Search
CPC ....... H04W 4/70; H04W 52/18; H04W 52/24; H04W 52/241; H04W 52/245;
(Continued)

(56) References Cited

U.S. PATENT DOCUMENTS

2006/0046709 A1* 3/2006 Krumm .............. H04N 21/4126
455/422.1
2007/0245420 A1* 10/2007 Yong ....................... H04L 41/28
726/23
(Continued)

FOREIGN PATENT DOCUMENTS

CN 103220788 A 7/2013
CN 104714412 A 6/2014
(Continued)

OTHER PUBLICATIONS

Extended European Search Report issued in corresponding EP Patent Application No. 16 19 4494, dated Feb. 15, 2017, 7 pages.
(Continued)

*Primary Examiner* — Timothy J Weidner
(74) *Attorney, Agent, or Firm* — Arch & Lake LLP

(57) ABSTRACT

The present disclosure discloses a smart device grouping system, method and apparatus, which belong to the field of smart home. The method includes: sending a transmission power value to one or more smart devices; acquiring signal strength information fed back by the smart devices. The signal strength information include signal strengths of the received signals and identifications of the smart devices sending the received signals. The received signals are broadcast by other smart devices based on the transmission power value. The method further includes grouping the selected smart devices according to the signal strength information fed back by said each smart device.

15 Claims, 7 Drawing Sheets

(51) Int. Cl.
  *H04L 29/06* (2006.01)
  *H04L 29/08* (2006.01)
  *H04W 4/70* (2018.01)
  *H04W 52/24* (2009.01)
  *H04W 52/38* (2009.01)
  *H04W 72/04* (2009.01)
  *H04W 84/18* (2009.01)

(52) U.S. Cl.
  CPC .............. *H04L 67/12* (2013.01); *H04L 69/26* (2013.01); *H04W 52/245* (2013.01); *H04W 52/383* (2013.01); *H04W 72/0473* (2013.01); *H04L 2012/2841* (2013.01); *H04W 84/18* (2013.01)

(58) Field of Classification Search
  CPC . H04W 52/38; H04W 52/383; H04W 52/386; H04W 72/0473; H04W 84/18–84/22; H04W 4/005; H04B 17/318; H04L 12/2803; H04L 2012/2841; H04L 67/12; H04L 67/125; H04L 69/26
  See application file for complete search history.

(56) References Cited

U.S. PATENT DOCUMENTS

| | | | |
|---|---|---|---|
| 2008/0218334 | A1 | 9/2008 | Pitchers et al. |
| 2014/0323048 | A1* | 10/2014 | Kang ................ H04W 4/008 455/41.2 |
| 2014/0348087 | A1 | 11/2014 | Wu et al. |
| 2015/0127733 | A1* | 5/2015 | Ding ................ H04W 4/08 709/204 |
| 2015/0200787 | A1* | 7/2015 | Slupik ................ G05B 15/02 700/275 |
| 2015/0230105 | A1* | 8/2015 | Negus ................ H04B 7/0408 370/329 |
| 2015/0312113 | A1* | 10/2015 | Forutanpour ........... H04W 4/70 715/734 |
| 2016/0316007 | A1 | 10/2016 | Hou et al. |
| 2017/0156038 | A1* | 6/2017 | Chen ................ H04W 4/70 709/223 |

FOREIGN PATENT DOCUMENTS

| | | |
|---|---|---|
| CN | 104932455 A | 9/2015 |
| CN | 105471628 A | 4/2016 |
| EP | 1612999 A1 | 1/2006 |
| EP | 2793521 A1 | 10/2014 |
| WO | 2006/095316 A1 | 9/2006 |
| WO | 2015167666 A1 | 11/2015 |

OTHER PUBLICATIONS

International Search Report issued in corresponding Chinese Patent Application No. PCT/CN2016/082694, dated Aug. 12, 2016, 12 pages.

English translation of International Preliminary Report on Patentability issued in corresponding International Application No. PCT/CN2016/082694, dated May 22, 2018, 7 pages.

International Preliminary Report on Patentability issued in corresponding International Application No. PCT/CN2016/082694, dated May 22, 2018, 5 pages.

* cited by examiner

SMART DEVICE GROUPING SYSTEM, METHOD AND APPARATUS

CROSS-REFERENCE TO RELATED APPLICATION

This application is based on and claims priority of the Chinese Patent Application No. 201510789757.8, filed on Nov. 17, 2015, which is incorporated herein by reference in its entirety.

TECHNICAL FIELD

The present disclosure is related to the field of smart home devices, and more particularly, to a smart device grouping system, method and apparatus.

BACKGROUND

With the development of smart home technology, users can control smart home appliances using mobile terminals.

However, as the number of smart home appliances in a house increases, the number of smart home appliances to be controlled by mobile terminals also increases. For example, multiple smart electric lamps may be provided in the same room. When multiple lamps need to be turned off, a user needs to select these lamps one by one from a device list using his/her mobile terminal and turn off these lamps one by one. Such a control process is of rather low efficiency.

SUMMARY

According to a first aspect of embodiments of the present disclosure, there is provided a smart device grouping system including a grouping terminal and at least two selected smart devices. The grouping terminal is configured to send a transmission power value to each of the selected smart devices. Each of the smart devices is configured to: broadcast a signal based on the transmission power value; and after receiving signals broadcast by the other one or more of the smart devices based on the transmission power value, generate pieces of signal strength information respectively based on signal strengths of the received signals and identifications of the smart devices sending the received signals. The grouping terminal is further configured to acquire the pieces of signal strength information generated by each smart device and group the selected smart devices based on the pieces of signal strength information.

According to a second aspect of the embodiments of the present disclosure, there is provided a smart device grouping method, including: sending a transmission power value to each of selected smart devices; acquiring pieces of signal strength information fed back by said each smart device, wherein said pieces of signal strength information are generated by the smart device after the smart device receives signals broadcast by the other one or more of the smart devices based on the transmission power value, respectively based on signal strengths of the received signals and identifications of the smart devices sending the received signals; and grouping the selected smart devices according to the pieces of signal strength information fed back by said each smart device.

According to a third aspect of the embodiments of the present disclosure, there is provided a smart device grouping method, including: receiving signals broadcast by one or more other smart devices, the signals being sent by the smart devices according to a transmission power value after the smart devices receive the transmission power value; for a signal sent by each of the smart devices, generating a signal strength information based on a received signal strength of the signal and an identification of the smart device sending the signal; and sending the signal strength information generated for each of the smart devices to a grouping terminal, to trigger the grouping terminal to group, based on the pieces of signal strength information acquired by the grouping terminal, smart devices generating respective sets of pieces of signal strength information.

According to a fourth aspect of the embodiments of the present disclosure, there is provided a smart device grouping apparatus, including: a power value transmitting module configured to send a transmission power value to each of selected smart devices; an acquiring module configured to acquire pieces of signal strength information fed back by said each smart device, wherein said pieces of signal strength information are generated by the smart device after the smart device receives signals broadcast by the other one or more of the smart devices based on the transmission power value sent by the power value transmitting module, respectively based on signal strengths of the received signals and identifications of the smart devices sending the received signals; and a grouping module configured to group the selected smart devices based on the pieces of signal strength information sent by each smart device and acquired by the acquiring module.

According to a fifth aspect of the embodiments of the present disclosure, there is provided a smart device grouping apparatus, including: a receiving module configured to receive signals broadcast by one or more other smart devices, the signals being sent by the smart devices according to a transmission power value after the smart devices receive the transmission power value; a generating module configured to: for a signal sent by each of the smart devices, generate a signal strength information based on a received signal strength of the signal and an identification of the smart device sending the signal; and a sending module configured to send the signal strength information generated by the generating module for each of the smart devices a grouping terminal, to trigger the grouping terminal to group, based on the pieces of signal strength information acquired by the grouping terminal, smart devices generating respective sets of pieces of signal strength information.

According to a sixth aspect of the embodiments of the present disclosure, there is provided a smart device grouping apparatus, including: a processor; and a memory storing instructions executable by the processor, wherein the processor is configured to: send a transmission power value to each of selected smart devices; acquire pieces of signal strength information fed back by said each smart device, wherein said pieces of signal strength information are generated by the smart device after the smart device receives signals broadcast by the other one or more of the smart devices based on the transmission power value, respectively based on signal strengths of the received signals and identifications of the smart devices sending the received signal; and group the selected smart devices according to the pieces of signal strength information fed back by said each smart device.

According to a seventh aspect of the embodiments of the present disclosure, there is provided a smart device grouping apparatus, including: a processor; and a memory storing instructions executable by the processor, wherein the processor is configured to: receive signals broadcast by one or more other smart devices, the signals being sent by the smart devices according to a transmission power value after the smart devices receive the transmission power value; for a signal sent by each of the smart devices, generate a signal strength information based on a received signal strength of the signal and an identification of the smart device sending the signal; and send the signal strength information generated for each of the smart devices to a grouping terminal, to trigger the grouping terminal to group, based on the pieces of signal strength information acquired by the grouping terminal, smart devices generating respective sets of pieces of signal strength information.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise presented. The embodiments set forth in the following description of exemplary embodiments do not represent all embodiments consistent with the disclosure. Instead, they are merely examples of apparatuses and methods consistent with aspects related to the disclosure as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Figure 1:
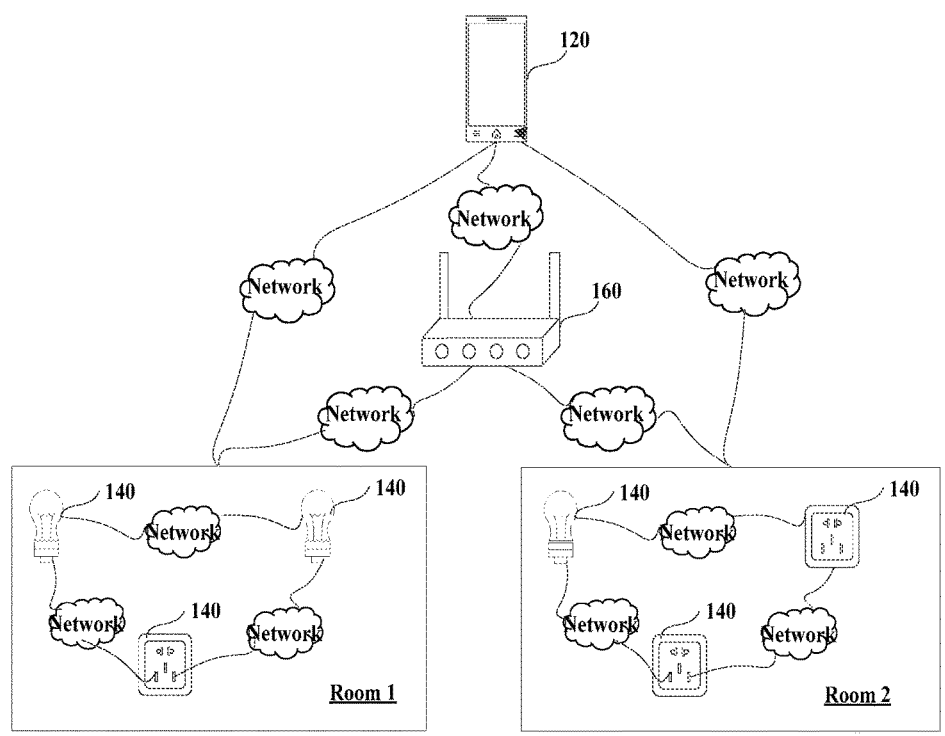
FIG. 1 is a schematic drawing showing an application environment where a smart device grouping method is implemented according to some embodiments.

FIG. 1 is a schematic drawing showing an application environment where a smart device grouping method is implemented according to some embodiments. As shown in FIG. 1, the application environment may include a grouping terminal 120 and at least two smart devices 140.

The grouping terminal 120 may be a device having a computing function, such as a mobile phone, a tablet computer, a server or the like. The grouping terminal 120 may include a communication chip to communicate with the smart devices 140 using transmitter circuitry and receiver circuitry in the communication chip.

The smart device 140 may be a device having a radio signal transmitting and receiving function, such as a smart electric lamp, a smart socket, a smart TV or the like. In actual house scenes, some smart devices 140 may be located in the same room, while other smart devices 140 may be located in a different room. A user may control all the smart devices in the same room at the same time.

The smart devices 140 may be connected to one another via wireless networks, which may be Bluetooth networks, NFC (Near Field Communication) networks and Zigbee (Zigzag Flying of Bees) networks.

The grouping terminal 120 may be connected with the smart devices 140 via wired networks or wireless networks.

Optionally, the application environment may include a router 160 which provides Wi-Fi (Wireless-Fidelity) connections for the grouping terminal 120 and the smart devices 140.

Figure 2A:
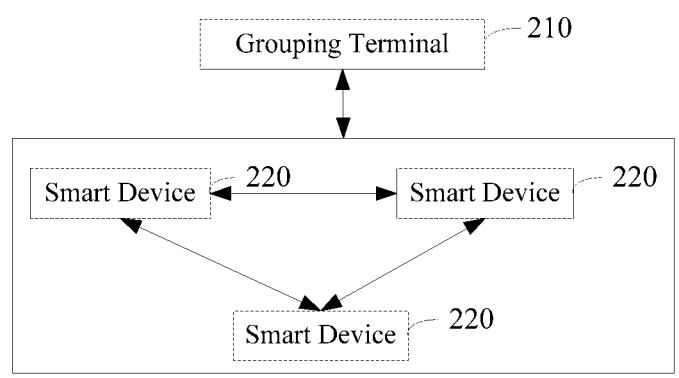
FIG. 2A is a block diagram showing a smart device grouping system according to one or more embodiments.

FIG. 2A is a block diagram showing a smart device grouping system according to one or more embodiments. As shown in FIG. 2A, the smart device grouping system may include a grouping terminal 210 and at least two selected smart devices 220. The selected smart devices 220 may be selected by a the smart device based on user inputs.

The grouping terminal 210 is configured to send a transmission power value to one or more smart devices. For example, the grouping terminal 210 may transmit a signal including the transmission power value to each of the selected smart devices Optionally, when determining the selected smart devices, the grouping terminal 210 may determine the smart devices 220 bound to the same account as the selected smart devices 220.

For example, when living in a smart house, a user may bind smart devices 220 in the house to the same account. In this case, the grouping terminal 210 can acquire the smart devices 220 bound to the account and transmit the transmission power value to the smart devices 220.

Optionally, when determining the selected smart devices, the grouping terminal 210 may determine smart devices located in the same local area network (LAN) as the selected smart devices.

The LAN referred to herein may be a LAN for a house or for an office or for a company. Obviously, the LAN may be a LAN for a community, and will not be restricted in the present disclosure.

Take a LAN for a house as an example. In practical smart home living, a router in the house can acquire identifications of the smart devices 220 connected to the router. In this case, the grouping terminal 210 may request the router for the identifications of the smart devices 220 connected to the router. The router may feed the identifications of the smart devices 220 connected to the router back to the grouping terminal 210 according to the request. The grouping terminal 210 may determine these smart devices 220 as the selected smart devices 220.

The grouping terminal 210 sends a transmission power value to at least one of the selected smart devices 220. The grouping terminal 210 may send the transmission power value to each of the selected smart devices 220 and instruct the selected smart devices 220 to broadcast signals according to the transmission power value.

In practical application, when the grouping terminal 210 sends the transmission power value, the transmission power value may be added into a data packet as a parameter. That is, the data packet includes a parameter indicating a transmission power. The grouping terminal 210 transmits the data packet to each of the selected smart devices 220.

The smart device 220 is configured to broadcast a signal based on the transmission power value sent by the grouping terminal 210. After receiving signals broadcast by the other smart devices 220 based on the transmission power value sent by the grouping terminal 210, the smart device 220 generates pieces of signal strength information respectively based on signal strengths of the received signals and identifications of the smart devices 200 sending the received signals.

When receiving the transmission power sent by the grouping terminal 210, the smart device 220 broadcasts a signal based on the transmission power value and receives signals broadcast by the other smart devices 220 based on the transmission power value.

Distances among the smart devices 220 may vary, and different obstacles may exist among the smart devices 220. Therefore, when the smart devices 220 broadcast signals to one another, attenuation degrees of the signals vary, and hence signal strengths received by the smart devices 220 also vary.

The smart device 220 generates pieces of signal strength information respectively based on signal strengths of the received signals and identifications of transmitters of the signals corresponding to the signal strengths, and feeds the pieces of signal strength information back to the grouping terminal 210.

That is, each signal strength information includes at least an identification of a smart device sending the respective signal and a signal strength of the received signal.

Optionally, the signal strength information may further include an identification of the smart device receiving the signal, namely, an identification of the smart device generating the signal strength information.

The grouping terminal 210 is further configured to acquire the pieces of signal strength information generated by each smart device 220 and group the selected smart devices 220 based on the pieces of signal strength information.

In a possible implementation, the grouping terminal 210 is further configured to: acquire identifications included in the pieces of signal strength information; select one or more pieces of signal strength information, so that the selected pieces of signal strength information include different identifications; group the selected pieces of signal strength information based on signal strengths included in the selected pieces of signal strength information, an absolute value of a difference between the signal strengths included in each group of pieces of signal strength information being less than a predetermined difference threshold; acquire identifications included in each group of pieces of signal strength information, and determine the smart devices having the identifications as belonging to one group.

As can be known from the definition of signal strength information, in addition to the signal strength of a received signal, each signal strength information further includes identifications of a transmitter and a receiver associated with the signal. Therefore, for the same signal strength information, the identifications it contains include identifications of the transmitter and the receiver.

In practical application, as each smart device may transmit a signal more than one times (for example, each smart device may transmit a signal every 5 seconds), signal strength information may be generated many times for at least one signal transmitted between two smart devices, and the difference among signal strengths relating to these signal strength information may be very small. In addition, the difference between signal strengths of signals mutually transmitted between two smart devices (e.g., a signal transmitted by a first smart device to a second smart device and a signal transmitted by the second smart device to the first smart device) may be very small. Therefore, to avoid repeated determinations, only one signal strength information may be selected from pieces of signal strength information related to two smart devices for subsequent grouping. That is, the pieces of signal strength information including different identifications may be selected first.

When selecting one or more pieces of signal strength information which include different identifications, a signal strength information may be selected as long as one identification included in the signal strength information is different from identification(s) included in existing piece(s) of signal strength information.

After selecting the pieces of signal strength information including different identifications, the grouping terminal 210 performs grouping based on signal strengths included in the selected pieces of signal strength information. The grouping may be performed such that an absolute value of a difference between the signal strengths included in each group of pieces of signal strength information is less than the predetermined difference threshold.

Figure 2B:
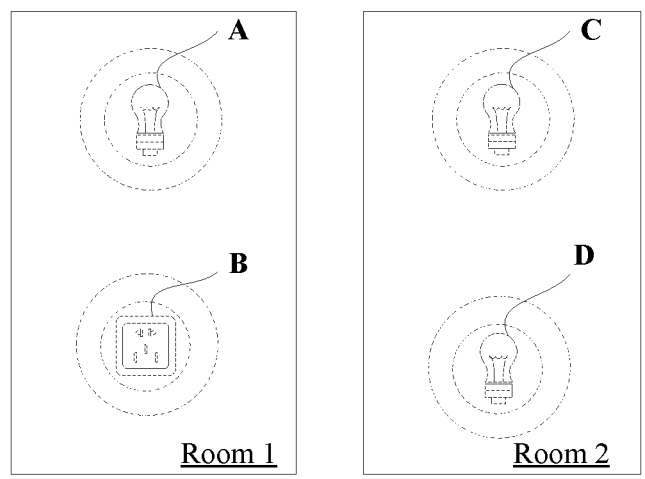
FIG. 2B is a schematic drawing showing how to group smart devices in two rooms according to one or more embodiments.

For example, FIG. 2B is a schematic diagram showing how to group smart devices in two rooms according to one or more embodiments. The first room has smart devices A and B located therein, and the second room has smart devices C and D located therein. The grouping terminal first transmits a transmission power value to the four smart devices respectively, and the four smart devices broadcast signals based on the transmission power value. A signal broadcast by one smart device is received by the other three smart devices. The signal propagation loss for two smart devices in the same room is relatively small, and the signal propagation loss for two smart devices in different rooms is relatively large. Therefore, when the smart device A broadcasts a signal, the signal strength of the signal received by the smart device B is relatively large, and the signal strengths of the signal received by the smart devices C and D are relatively small. Then, the grouping terminal determines that the smart devices A and B belong to one group. And similarly, the grouping terminal determines that the smart devices C and D belong to one group.

Obviously, using the above grouping method, the smart devices in the same room may be grouped into one group, and the smart devices in a different room can be grouped into another group. Thus, the smart devices in different rooms are grouped into different groups, and the smart devices in the same room are grouped into the same group.

In one or more embodiments, different types of smart devices may be located in the same room. In practice, a user may only need to control the same type of smart devices. For example, the user may only need to control all the smart electric lamps in one room, and may not need to control any other type of smart devices in the room. In this case, the grouping terminal 210 is further configured to: acquire types of smart devices 220 in each group, and group the same type of smart devices 220 in the group into a sub-group, the type being a smart electric lamp type or a smart socket type.

That is, the grouping terminal 210 may group smart electric lamps into one sub-group and groups smart sockets into another sub-group, so that each sub-group can be controlled independently.

Optionally, when acquiring the types of the smart devices 220, the grouping terminal 210 may distinguish the types of the smart devices 220 based on the identifications of the smart devices 220 included in the pieces of signal strength information.

For example, the grouping terminal 210 may group the smart devices 220 based on the signal strengths included in the pieces of signal strength information. As a result of grouping, each group of smart devices 220 may include various types of smart devices 220, such as smart electric lamps, smart sockets and the like. In this case, grouping may be further performed based on the types, so that the smart devices of the same type can be controlled simultaneously.

To sum up, the smart device grouping system provided by the present disclosure may produce the following advantageous effects. Because the grouping terminal transmits the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

Because the signal propagation loss in the same room is relatively small and the signal propagation loss between different rooms is relatively large, it can be ensured that, by grouping senders and receivers associated with signal strengths differing from each other by less than a predetermined difference threshold into the same group, the smart devices in the same room can be successfully grouped into the same group.

Because multiple types of smart devices may be located in the same room, by grouping based on the types, it is more convenient for a user to control and maintain the smart devices in the same room. For example, the smart electric lamps in the same room may be turned off at the same time, or the smart sockets in the same room may be powered on at the same time.

Figure 3:
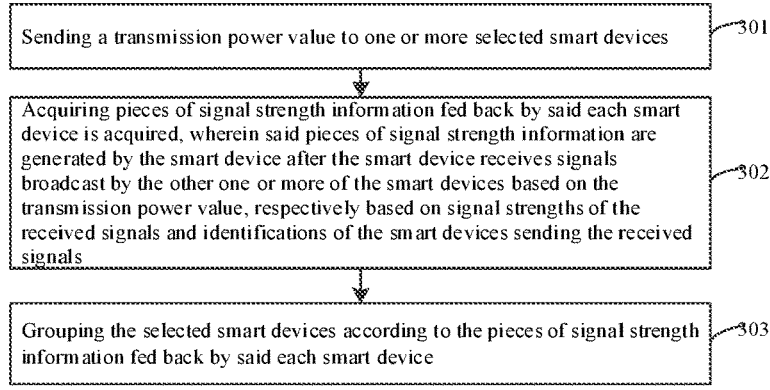
FIG. 3 is a flow chart showing a smart device grouping method according to one or more embodiments.

FIG. 3 is a flow chart showing a smart device grouping method according to one or more embodiments. As shown in FIG. 3, the smart device grouping method is applied in the grouping terminal 120 in the application environment shown in FIG. 1, and may comprise the following steps.

In step 301, a transmission power value is sent to each of selected smart devices.

In step 302, pieces of signal strength information fed back by said each smart device are acquired, wherein said pieces of signal strength information are generated by the smart device after the smart device receives signals broadcast by the other one or more of the smart devices based on the transmission power value, respectively based on signal strengths of the received signals and identifications of the smart devices sending the received signals.

In step 303, the selected smart devices are grouped according to the pieces of signal strength information fed back by said each smart device.

To sum up, the smart device grouping method provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the same can be solved, and the effect of automatic grouping and collectively controlling the smart devices can be achieved.

Figure 4:
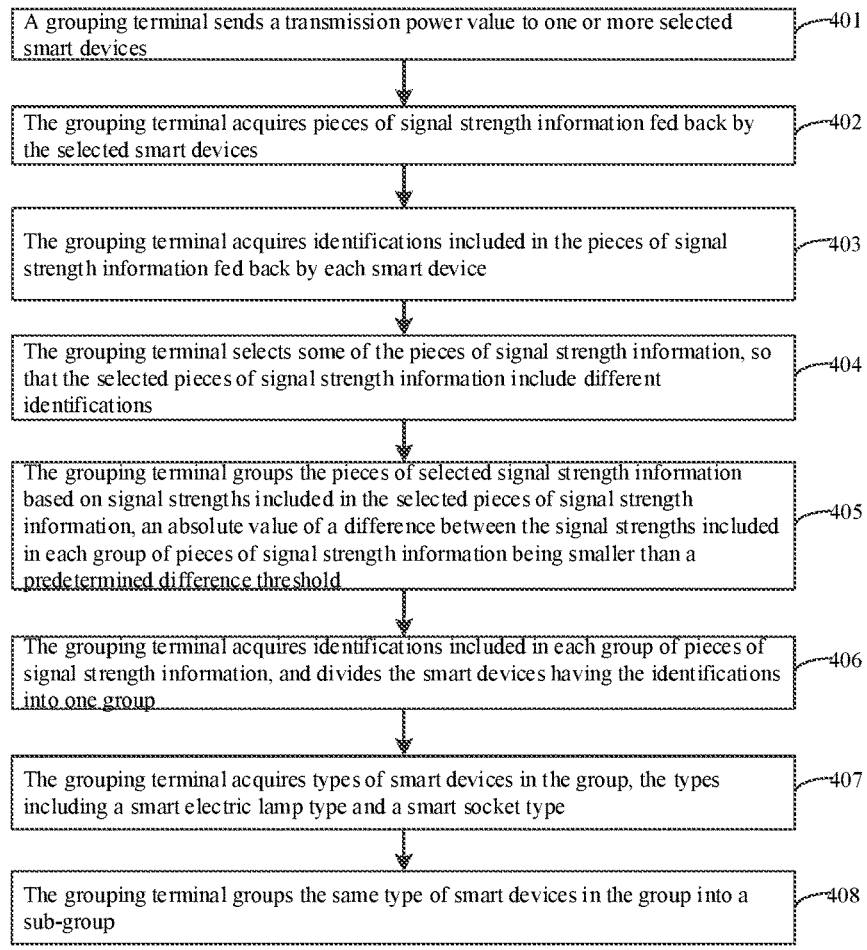
FIG. 4 is a flow chart showing a smart device grouping method according to one or more embodiments.

FIG. 4 is a flow chart showing a smart device grouping method according to one or more embodiments. As shown in FIG. 4, the smart device grouping method is applied in the grouping terminal 120 in the application environment shown in FIG. 1, and may comprise the following steps.

In step 401, the grouping terminal sends a transmission power value to one or more selected smart devices. The grouping terminal may transmit a signal including a transmission power value to each selected smart device.

The grouping terminal may be a device having a computing function, such as a mobile phone, a server, a tablet computer, a computer message transceiving device or the like.

In a possible implementation, the grouping terminal may determine smart devices bound to the same user account as the selected smart devices or determine smart devices located in the same local area network (LAN) as the selected smart devices.

In step 402, the grouping terminal acquires pieces of signal strength information fed back by the selected smart devices.

The pieces of signal strength information are generated by the smart device after the smart device receives signals broadcast by the other one or more of the smart devices based on the transmission power value, respectively based on signal strengths of the received signals and identifications of the smart devices sending the received signals.

In step 403, the grouping terminal acquires identifications included in the pieces of signal strength information fed back by each smart device.

In step 404, the grouping terminal selects one or more pieces of signal strength information, so that the selected pieces of signal strength information include different identifications.

As can be known from the definition of signal strength information, in addition to the signal strength of a received signal, each signal strength information further includes identifications of a transmitter and a receiver that are associated with the signal. Therefore, for the same signal strength information, the identifications it contains include identifications of the transmitter and the receiver.

In practical application, as each smart device may transmit a signal more than one times (for example, each smart device may transmit a signal every 5 seconds), signal strength information may be generated many times for at least one signal transmitted between two smart devices, and the difference among signal strengths relating to these signal strength information may be very small. Therefore, to avoid repeated determinations, only one signal strength information may be selected from pieces of signal strength information related to two smart devices for subsequent grouping. That is, the pieces of signal strength information including different identifications may be selected first.

When selecting one or more pieces of signal strength information which include different identifications, a signal strength information may be selected as long as one identification included in the signal strength information is different from identification(s) included in existing piece(s) of signal strength information.

For example, smart devices A, B and C broadcast signals. When receiving a signal broadcast by the smart device B, the smart device A generates first signal strength information based on a signal strength of the signal; when receiving a signal broadcast by the smart device C, the smart device A generates second signal strength information based on a signal strength of the signal. When receiving a signal broadcast by the smart device A, the smart device B generates third signal strength information based on a signal strength of the signal; when receiving a signal broadcast by the smart device C, the smart device B generates fourth signal strength information based on a signal strength of the signal. When receiving a signal broadcast by the smart device A, the smart device C generates fifth signal strength information based on a signal strength of the signal; when receiving a signal broadcast by the smart device B, the smart device C generates sixth signal strength information based on a signal strength of the signal. Please refer to Table 1.

TABLE 1

| Signal strength information | Identification of the transmitter | Identification of the receiver | Signal strength |
|---|---|---|---|
| First signal strength information | B | A | −30 dbm |
| Second signal strength information | C | A | −32 dbm |
| Third signal strength information | A | B | −30 dbm |
| Fourth signal strength information | C | B | −38 dbm |
| Fifth signal strength information | A | C | −32 dbm |
| Sixth signal strength information | B | C | −38 dbm |

The grouping terminal selects pieces of signal strength information which include different identifications. Identifications included in both the first and the third signal strength information are A and B. Identifications included in both the second and the fifth signal strength information are A and C. Identifications included in both the fourth and the sixth signal strength information are B and C. The grouping terminal selects one of the first and the third signal strength information, one of the second and the fifth signal strength information, and one of the fourth and the sixth signal strength information based on different identifications included in these pieces of signal strength information.

It should be noted that, for the convenience of illustration, the above identifications for the smart devices are represented by letters. In practical implementation, the identification of a smart device may be represented by letters, symbols and numbers or any combination thereof, and will not be restricted in the present disclosure.

In step 405, the grouping terminal groups the selected pieces of signal strength information based on signal strengths included in the selected pieces of signal strength information, an absolute value of a difference between the signal strengths included in each group of pieces of signal strength information being less than a predetermined difference threshold.

In a possible implementation, the predetermined difference threshold may be recommended by the system of the grouping terminal or may be set and modified by users.

By way of example, the predetermined difference threshold may be 5 dbm. Referring again to Table 1, the grouping terminal selects the first and the second signal strength information based on the signal strengths included in these signal strength information.

In step 406, the grouping terminal acquires identifications included in each group of pieces of signal strength information, and divides the smart devices having the identifications into one group.

Referring again to Table 1, the grouping terminal acquires identifications included in the first and the second signal strength information (that is, A, B and C), and groups the smart devices A, B and C into one group.

In a possible implementation, each of the resulting groups may be further divided. The dividing method may comprise the following steps.

In step 407, the grouping terminal acquires types of smart devices in the group, the types including a smart electric lamp type or a smart socket type.

In step 408, the grouping terminal groups the same type of smart devices in the group into a sub-group.

In a possible implementation, the grouping terminal receives a control instruction for controlling the respective smart devices in a designated group, and sends the control instruction to the smart devices in the designated group. The smart devices receive the control instruction and perform a corresponding operation based on the control instruction. The corresponding operation may be starting, ending or adjusting a corresponding operation mode.

To sum up, the smart device grouping method provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the same can be solved, and the effect of automatic grouping and collectively controlling the smart devices can be achieved.

Because the signal propagation loss in the same room is relatively small and the signal propagation loss between different rooms is relatively large, it can be ensured that, by grouping senders and receivers associated with signal strengths differing from each other by less than a predetermined difference threshold into the same group, the smart devices in the same room can be successfully grouped into the same group.

Because multiple types of smart devices may be located in the same room, by grouping based on the types, it is more convenient for a user to control and maintain the smart devices in the same room. For example, the smart electric lamps in the same room may be turned off at the same time, or the smart sockets in the same room may be powered on at the same time.

The selected smart devices can be determined automatically based on a user account or a LAN, so that the user is saved from adding smart devices by himself/herself tediously and accuracy of acquiring the selected smart devices can be ensured.

The smart devices in the designated group can be controlled based on a control instruction for the group, thereby improving the control efficiency.

Figure 5:
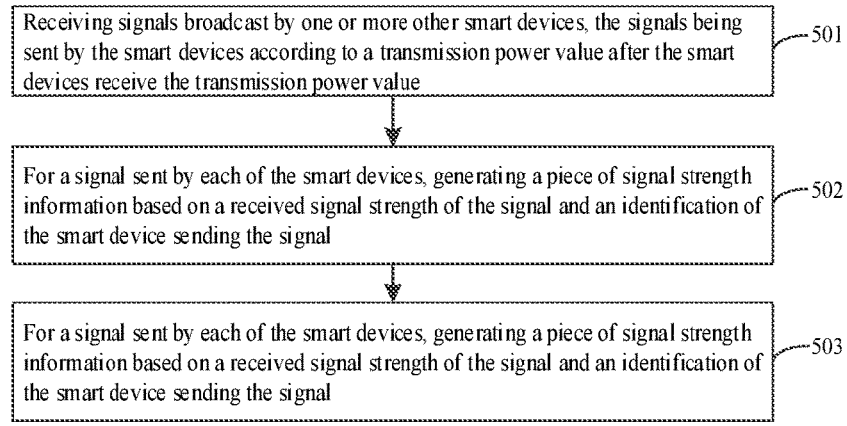
FIG. 5 is a flow chart showing a smart device grouping method according to one or more embodiments.

FIG. 5 is a flow chart showing a smart device grouping method according to one or more embodiments. As shown in FIG. 5, the smart device grouping method is applied in a smart device 140 in the application environment shown in FIG. 1, and may comprise the following steps.

In step 501, signals broadcast by one or more other smart devices are received, the signals being sent by the smart devices according to a transmission power value after the smart devices receive the transmission power value.

In step 502, for a signal sent by each of the smart devices, a signal strength information is generated based on a received signal strength of the signal and an identification of the smart device sending the signal.

In step 503, the signal strength information generated for each of the smart devices is sent to a grouping terminal, to trigger the grouping terminal to group, based on the pieces of signal strength information acquired by the grouping terminal, smart devices generating respective sets of pieces of signal strength information.

To sum up, the smart device grouping method provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

Figure 6:
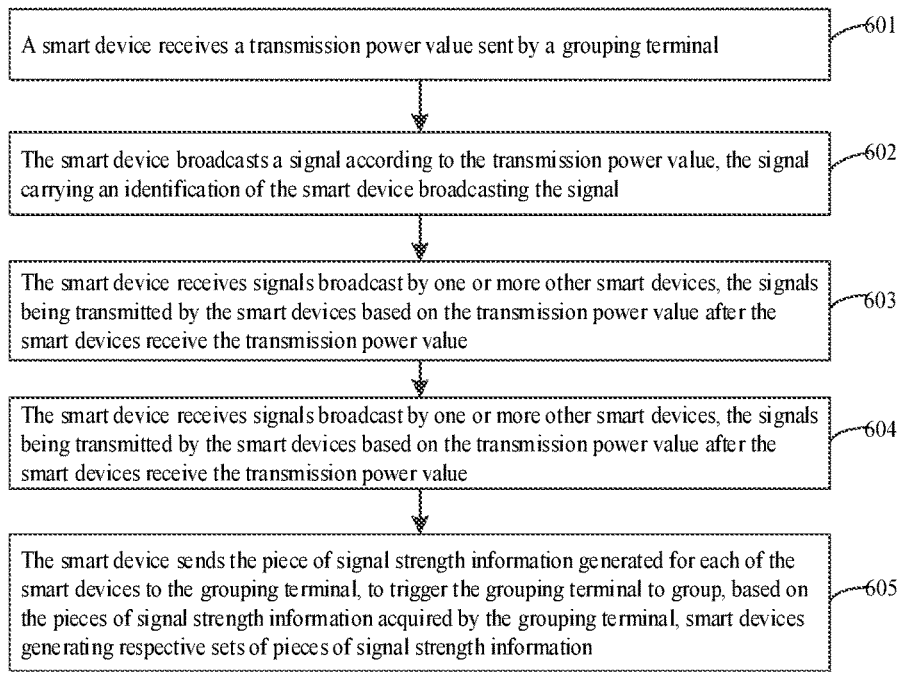
FIG. 6 is a flow chart showing a smart device grouping method according to still one or more embodiments.

FIG. 6 is a flow chart showing a smart device grouping method according to one or more embodiments. As shown in FIG. 6, the smart device grouping method is applied in a smart device 140 in the application environment shown in FIG. 1, and may comprise the following steps.

In step 601, a smart device receives a transmission power value sent by a grouping terminal.

The smart device may be a device having a radio signal transmitting and receiving function, such as a smart electric lamp, a smart socket, a smart TV, a smart air conditioner or the like.

In step 602, the smart device broadcasts a signal according to the transmission power value, the signal carrying an identification of the smart device broadcasting the signal.

After receiving the transmission power value transmitted by the grouping terminal, the smart device can broadcast a signal according to the transmission power value.

In practical implementation, to avoid signal transmission failure or severe interference by other signals which in turn causes the grouping terminal to be unable to perform grouping successfully, the smart device may broadcast a signal according to the transmission power several times.

For example, the smart device may broadcast a signal according to the transmission power at a predetermined time interval, which may be designated by the grouping terminal. For example, the grouping terminal may add the transmission power value and the designated predetermined time interval into the same data packet, and transmit the data packet to each selected smart device. In this way, after receiving the data packet, the smart device may broadcast a signal according to the transmission power at the designated predetermined time interval.

Obviously, the smart device may broadcast a predetermined number of signals. The predetermined number may be designated by the grouping terminal. For example, the grouping terminal may add the transmission power and the designated predetermined number into the same data packet, and transmit the data packet to each selected smart device. In this way, after receiving the data packet, the smart device may broadcast the designated predetermined number of signals according to the transmission power.

In step 603, the smart device receives signals broadcast by one or more other smart devices, the signals being transmitted by the smart devices based on the transmission power value after the smart devices receive the transmission power value.

In step 604, for a signal sent by each of the smart devices, the smart device generates a signal strength information based on a received signal strength of the signal and an identification of the smart device sending the signal.

Optionally, the generated signal strength information may further comprise an identification of the smart device which generates the signal strength information, namely, an identification of the smart device which receives the signal.

In step 605, the smart device sends the signal strength information generated for each of the smart devices to the grouping terminal, to trigger the grouping terminal to group, based on the pieces of signal strength information acquired by the grouping terminal, smart devices generating respective sets of pieces of signal strength information.

For details of the process via which the grouping terminal groups smart devices based on acquired pieces of signal strength information, reference can be made to the above-described smart device grouping system. Description thereof will not be repeated herein.

To sum up, the smart device grouping method provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

The followings describe the apparatus embodiments of the present disclosure, which may be used to perform the method embodiments of the present disclosure. For the details not disclosed in the apparatus embodiments of the present disclosure, reference can be made to the method embodiments of the present disclosure.

Figure 7:
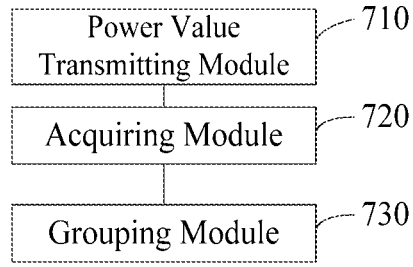
FIG. 7 is a block diagram showing a smart device grouping apparatus according to one or more embodiments.

FIG. 7 is a block diagram showing a smart device grouping apparatus according to one or more embodiments. The smart device grouping apparatus may be realized as the grouping terminal 120 in the above application environment or a part of it in the form of software, hardware or a combination thereof. As shown in FIG. 7, the smart device grouping apparatus includes a power value transmitting module 710, an acquiring module 720 and a grouping module 730.

The power value transmitting module 710 is configured to transmit a transmission power value to each of selected smart devices.

The acquiring module 720 is configured to acquire pieces of signal strength information fed back by said each smart device, wherein said pieces of signal strength information are generated by the smart device after the smart device receives signals broadcast by the other one or more of the smart devices based on the transmission power value transmitted by the power value transmitting module 710, respectively based on signal strengths of the received signals and identifications of the smart devices sending the received signals.

The grouping module 730 is configured to group the selected smart devices based on the pieces of signal strength information sent by each smart device and acquired by the acquiring module 720.

To sum up, the smart device grouping apparatus provided by the present disclosure may produce the following advantageous effects. Because the grouping terminal transmits the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

Figure 8:
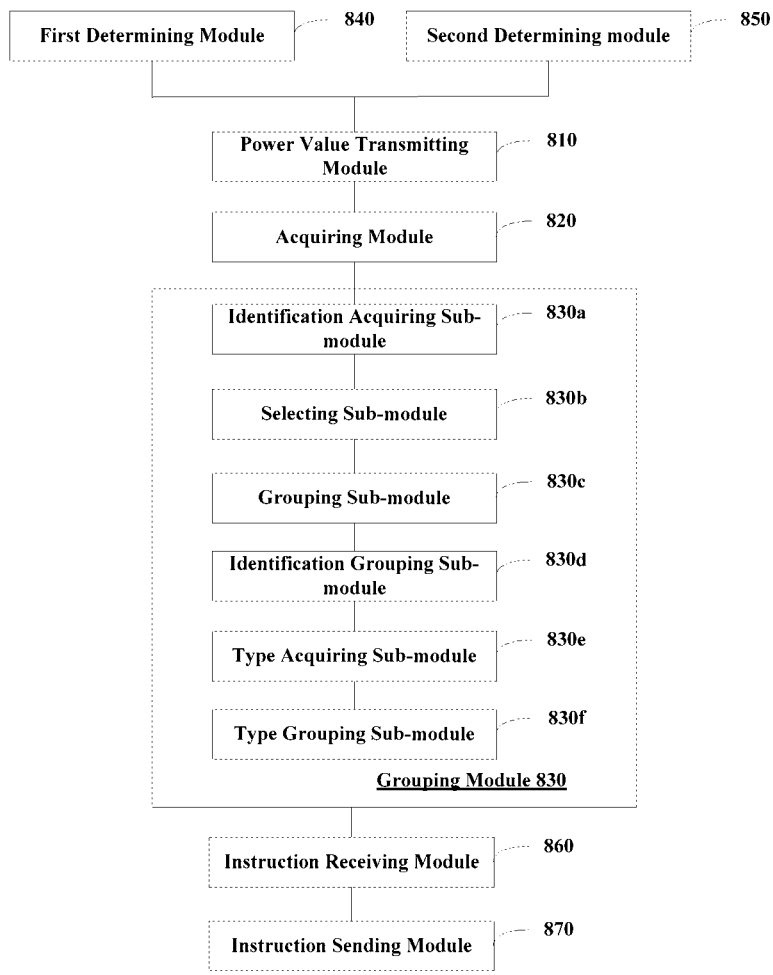
FIG. 8 is a block diagram showing a smart device grouping apparatus according to one or more embodiments.

FIG. 8 is a block diagram showing a smart device grouping apparatus according to one or more embodiments. The smart device grouping apparatus may be realized as the grouping terminal 120 in the above application environment or a part of it in the form of software, hardware or a combination thereof. As shown in FIG. 8, the smart device grouping apparatus includes a power value transmitting module 810, an acquiring module 820 and a grouping module 830.

The power value transmitting module 810 is configured to transmit a transmission power to each of selected smart devices.

The grouping terminal transmits a transmission power value to each of the selected smart devices, to instruct the selected smart devices to broadcast signals according to the transmission power value.

In practical application, when the grouping terminal transmits the transmission power value, the transmission power value is usually added into a data packet as a parameter. That is, the data packet includes a parameter indicating a transmission power. The grouping terminal transmits the data packet to each of the selected smart devices.

The acquiring module 820 is configured to acquire pieces of signal strength information fed back by said each smart device, wherein said pieces of signal strength information are generated by the smart device after the smart device receives signals broadcast by the other one or more of the smart devices based on the transmission power value transmitted by the power value transmitting module 810, respectively based on signal strengths of the received signals and identifications of the smart devices sending the received signals.

In a possible implementation, each signal strength information acquired by the acquiring module 820 further includes an identification of the smart device which generates the signal strength information.

The grouping module 830 is configured to group the selected smart devices according to the pieces of signal strength information fed back by said each smart device and acquired by the acquiring module 820.

In a possible implementation, the grouping module 830 may comprise an identification acquiring sub-module 830a, a selecting sub-module 830b, a grouping sub-module 830c and an identification grouping sub-module 830d.

The identification acquiring sub-module 830a is configured to acquire identifications included in the pieces of signal strength information and acquired by the acquiring module 820.

Identifications included in each signal strength information generally include an identification of the smart device sending the corresponding signal and an identification of the smart device receiving the signal.

The selecting sub-module 830b is configured to select one or more pieces of signal strength information, so that the selected pieces of signal strength information include different identifications acquired by the acquiring sub-module 830a.

In practical application, as each smart device may transmit a signal more than one times (for example, each smart device may transmit a signal every 5 seconds), signal strength information may be generated many times for at least one signal transmitted between two smart devices, and the difference among signal strengths relating to these signal strength information may be very small. In addition, the difference between signal strengths of signals mutually transmitted between two smart devices (e.g., a signal transmitted by a first smart device to a second smart device and a signal transmitted by the second smart device to the first smart device) may be very small. Therefore, to avoid repeated determinations, only one signal strength information may be selected from pieces of signal strength information related to two smart devices for subsequent grouping. That is, the pieces of signal strength information including different identifications may be selected first.

When selecting one or more pieces of signal strength information which include different identifications, a signal strength information may be selected as long as one identification included in the signal strength information is different from identification(s) included in existing piece(s) of signal strength information.

The grouping sub-module 830c is configured to group the selected pieces of signal strength information selected by the selecting sub-module 830b based on signal strengths included in the selected pieces of signal strength information, an absolute value of a difference between the signal strengths included in each group of pieces of signal strength information being less than a predetermined difference threshold.

When different identifications are included, the difference between pieces of signal strength information is usually large, but the difference between signal strengths of signals transmitted in the same room is still less than that between signal strengths of signals transmitted between different rooms. Therefore, pieces of signal strength information including signal strengths whose absolute difference is less than the predetermined difference threshold can be grouped into one group.

The identification grouping sub-module 830d is configured to acquire identifications included in each group of pieces of signal strength information grouped by the grouping sub-module 830c and divide the smart devices having the identifications into one group.

In a possible implementation, the apparatus may further comprise a type acquiring sub-module 830e and a type grouping sub-module 830f.

The type acquiring sub-module 830e is configured to acquire types of smart devices in the group grouped by the identification grouping sub-module 830d, the types including a smart electric lamp type and a smart socket type.

The type grouping sub-module 830f is configured to group the same type of smart devices in the group into a sub-group based on the types of smart devices in the group acquired by the type acquiring sub-module 830e.

In a possible implementation, different types of smart devices may be located in the same room. In practice, a user may only need to control the same type of smart devices. For example, the user may only need to control all the smart electric lamps in one room, and may not need to control any other type of smart devices. In this case, the smart devices in one group may be further divided based on their types.

For example, the grouping terminal may group smart electric lamps into one sub-group and groups smart sockets into another sub-group based on the types of the smart devices, so that each sub-group can be controlled independently.

Optionally, the apparatus may further comprise a first determining module 840.

The first determining module 840 is configured to determine smart devices bound to the same user account as the selected smart devices.

For example, when living in a smart house, a user may bind smart devices in the house to the same account. In this case, the grouping terminal can acquire the smart devices bound to the account, and transmit the transmission power value to these smart devices.

Optionally, the apparatus may further comprise a second determining module 850.

The second determining module 850 is configured to determine smart devices located in the same local area network (LAN) as the selected smart devices.

The LAN referred to herein may be a LAN for a house or for an office or for a company. Obviously, the LAN may be a LAN for a community, and will not be restricted in the present disclosure.

Take a LAN for a house as an example. In practical smart home living, a router in the house can acquire the identifications of the smart devices connected to the router. In this case, the grouping terminal may request the router for the identifications of the smart devices connected to the router. The router may feed the identifications of the smart devices connected to the router back to the grouping terminal according to the request. The grouping terminal may determine these smart devices as the selected smart devices.

In a possible implementation, the apparatus may further comprise an instruction receiving module 860 and an instruction sending module 870.

The instruction receiving module 860 is configured to receive a control instruction for controlling the smart devices in a designated group.

The control instruction mentioned here refers to a control instruction set based on the common features of the smart devices in one group, and may be a turning-off instruction, a turning-on instruction or a power-off instruction.

The instruction sending module 870 is configured to send the control instruction to each smart device in the designated group.

To sum up, the smart device grouping apparatus provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

Because the signal propagation loss in the same room is relatively small and the signal propagation loss between different rooms is relatively large, it can be ensured that, by grouping senders and receivers associated with signal strengths differing from each other by less than a predetermined difference threshold into the same group, the smart devices in the same room can be successfully grouped into the same group.

Because multiple types of smart devices may be located in the same room, by grouping based on the types, it is more convenient for a user to control and maintain the smart devices in the same room. For example, the smart electric lamps in the same room may be turned off at the same time, or the smart sockets in the same room may be powered on at the same time.

The selected smart devices can be determined automatically based on a user account or a LAN, so that the user is saved from adding smart devices by himself/herself tediously and accuracy of acquiring the selected smart devices can be ensured.

The smart devices in the designated group can be controlled based on a control instruction for the group, thereby improving the control efficiency.

Figure 9:
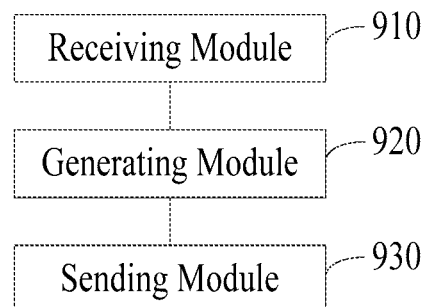
FIG. 9 is a block diagram showing a smart device grouping apparatus according to one or more embodiments.

FIG. 9 is a block diagram showing a smart device grouping apparatus according to one or more embodiments. The smart device grouping apparatus may be realized as the smart device 140 in the above application environment or a part of it in the form of software, hardware or a combination thereof. As shown in FIG. 9, the smart device grouping apparatus includes a receiving module 910, a generating module 920 and a sending module 930.

The receiving module 910 is configured to receive signals broadcast by one or more other smart devices, the signals being sent by the smart devices according to a transmission power value after the smart devices receive the transmission power value.

The generating module 920 is configured to, for a signal sent by each of the smart devices, generate a signal strength information based on a received signal strength of the signal and an identification of the smart device sending the signal.

The sending module 930 is configured to send the signal strength information generated by the generating module for each of the smart devices to a grouping terminal, to trigger the grouping terminal to group, based on the pieces of signal strength information acquired by the grouping terminal, smart devices generating respective sets of pieces of signal strength information.

To sum up, the smart device grouping apparatus provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

Figure 10:
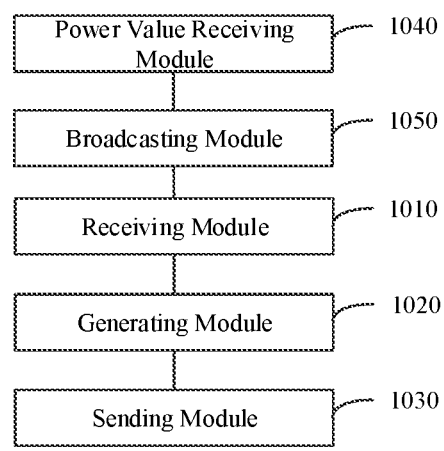
FIG. 10 is a block diagram showing a smart device grouping apparatus according to still one or more embodiments.

FIG. 10 is a block diagram showing a smart device grouping apparatus according to one or more embodiments. The smart device grouping apparatus may be realized as the smart device 140 in the above application environment or a part of it in the form of software, hardware or a combination thereof. As shown in FIG. 10, the smart device grouping apparatus includes a receiving module 1010, a generating module 1020 and a sending module 1030.

The receiving module 1010 is configured to receive signals broadcast by one or more other smart devices, the signal being transmitted by the smart devices based on a transmission power value after the smart devices receive the transmission power value.

The generating module 1020 is configured to, for a signal sent by each of the smart devices, generate a signal strength information based on a received signal strength of the signal and an identification of the smart device sending the signal.

The sending module 1030 is configured to send the signal strength information generated for each of the smart devices to a grouping terminal, to trigger the grouping terminal to group, based on the pieces of signal strength information acquired by the grouping terminal, smart devices generating respective sets of pieces of signal strength information.

In a possible implementation, the apparatus may further comprise a power value receiving module 1040 and a broadcasting module 1050.

The power value receiving module 1040 is configured to receive a transmission power value transmitted by the grouping terminal.

The broadcasting module 1050 is configured to broadcast a signal based on the transmission power value received by the power value receiving module 1040, the signal carrying an identification of a smart device broadcasting the signal.

After receiving the transmission power value transmitted by the grouping terminal, the smart device may broadcast a signal according to the transmission power value.

In practical implementation, to avoid signal transmission failure or severe interference by other signals which in turn causes the grouping terminal to be unable to perform grouping successfully, the smart device may broadcast a signal according to the transmission power value several times.

For example, the smart device may broadcast a signal according to the transmission power value at a predetermined time interval, which may be designated by the grouping terminal. For example, the grouping terminal may add the transmission power value and the designated predetermined time interval into the same data packet, and transmit the data packet to each selected smart device. In this way, after receiving the data packet, the smart device may broadcast a signal according to the transmission power value at the designated predetermined time interval.

Obviously, the smart device may broadcast a predetermined number of signals. The predetermined number may be designated by the grouping terminal. For example, the grouping terminal may add the transmission power value and the designated predetermined number into the same data packet, and transmit the data packet to each selected smart device. In this way, after receiving the data packet, the smart device may broadcast the designated predetermined number of signals according to the transmission power value.

To sum up, the smart device grouping apparatus provided by the present disclosure may produce the following advantageous effects. The smart device grouping system provided by the present disclosure may produce the following advantageous effects. Because the grouping terminal sends the transmission power value to the smart devices, each of the smart devices can broadcast a signal based on the transmission power value, receive signal(s) broadcast by the other smart device(s) based on the transmission power value, and feed received signal strength(s) back to the grouping terminal, which groups the smart devices based on the signal strengths. Because the grouping terminal can control each of the smart devices to broadcast a signal based on the same power and to collect power strength(s) of signal(s) sent by the other smart device(s) and then the grouping terminal can perform automatic grouping based on the power strengths, the technical problem of low efficiency in the prior arts caused by having to select smart devices one by one before controlling the smart devices can be solved, and the effect of automatic grouping and collectively controlling the smart devices can be achieved.

With respect to the apparatuses in the above embodiments, the specific manners for performing operations for individual modules therein have been described in detail in the embodiments regarding the related methods, and will not be elaborated herein.

One or more embodiments of the present disclosure provides a smart device grouping apparatus, which can perform the smart device grouping method provided by the embodiments of the present disclosure and which includes a processor; and a memory storing instructions executable by the processor. The processor is configured to: transmit a transmission power value to each of selected smart devices; acquire pieces of signal strength information fed back by said each smart device, wherein said pieces of signal strength information are generated by the smart device after the smart device receives signals broadcast by the other one or more of the smart devices based on the transmission power value, respectively based on signal strengths of the received signals and identifications of the smart devices sending the received signals; and group the selected smart devices according to the pieces of signal strength information fed back by said each smart device.

One or more embodiments of the present disclosure provides a smart device grouping apparatus, which can perform the smart device grouping method provided by the embodiments of the present disclosure and which includes a processor; and a memory storing instructions executable by the processor. The processor is configured to: receive signals broadcast by one or more other smart devices, the signals being sent by the smart devices according to a transmission power value after the smart devices receive the transmission power value; for a signal sent by each of the smart devices, generate a signal strength information based on a received signal strength of the signal and an identification of the smart device sending the signal; and send the signal strength information generated for each of the smart devices to a grouping terminal, to trigger the grouping terminal to group, based on the pieces of signal strength information acquired by the grouping terminal, smart devices generating respective sets of pieces of signal strength information.

Figure 11:
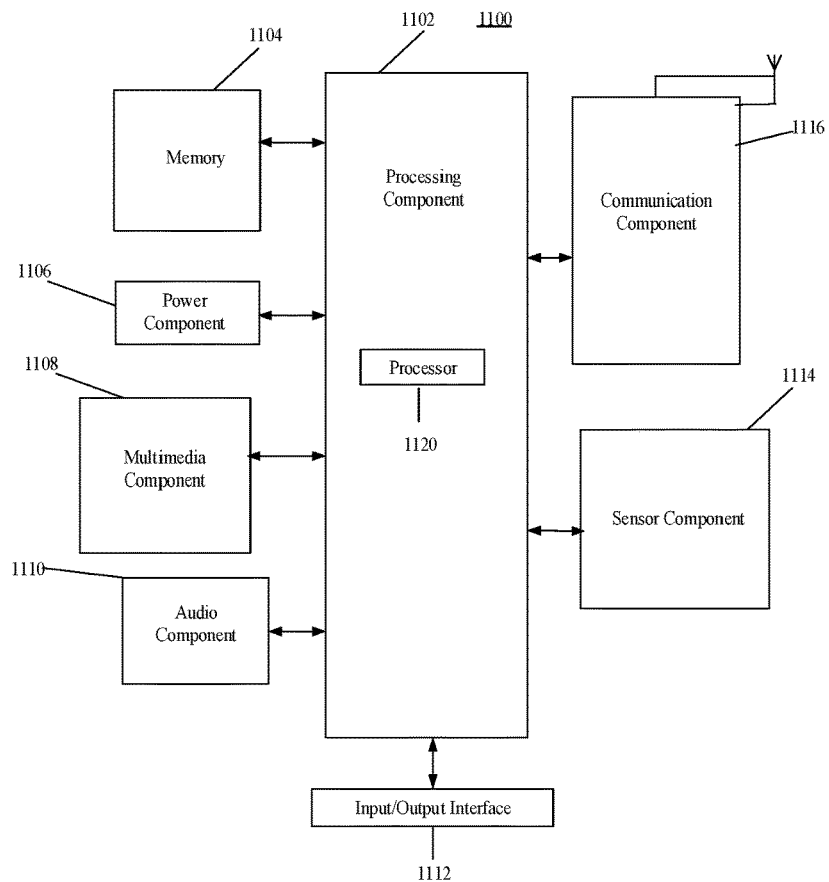
FIG. 11 is a block diagram showing a smart device grouping apparatus according to one or more embodiments.

FIG. 11 is a block diagram showing a smart device grouping apparatus 1100 according to a further embodiment. For example, the apparatus 1100 may be a mobile phone, a server, a tablet, a computer, a messaging device or the like.

Referring to FIG. 11, the apparatus 1100 may include one or more of the following hardware components: a processing component 1102, a memory 1104, a power component 1106, a multimedia component 1108, an audio component 1110, an input/output (I/O) interface 1112, a sensor component 1114, and a communication component 1116. Each of the hardware components may include one or more chips and circuits.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and the rear camera may receive an external multimedia datum while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the apparatus 1100. For instance, the sensor component 1114 may detect an open/closed status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 may be a communication chip that is configured to facilitate communication, wired or wirelessly, between the apparatus 1100 and other devices. The apparatus 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more embodiments, there is also provided a non-transitory computer-readable storage medium including instructions, such as included in the memory 1104, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

Figure 12:
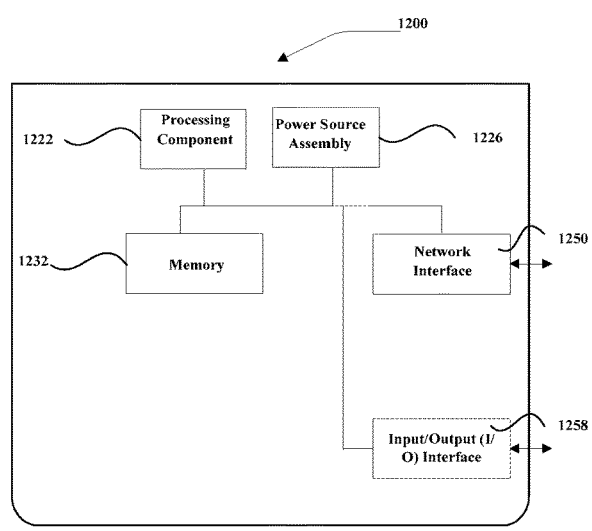
FIG. 12 is a block diagram showing a smart device grouping apparatus according to one or more embodiments.

FIG. 12 is a block diagram showing a smart device grouping apparatus according to one or more embodiments. For example, the smart device grouping apparatus 1200 may be provided as a smart electric lamp, a smart socket, a smart TV, a smart air conditioner or the like. As shown in FIG. 12, the smart device grouping apparatus 1200 includes a processing component 1222 which further includes one or more processors, and memory resources represented by a memory 1232 for storing instructions executable by the processing component 1222 such as applications. The applications stored in the memory 1232 may include one or more modules, each corresponding to a set of instructions. The processing component 1222 is configured to execute instructions so as to perform the above smart device grouping method executed by smart device.

The apparatus 1200 may also include a power source assembly 1226 which is configured to execute power management for the apparatus 1200, a wired or wireless network interface 1250 which is configured to connect the apparatus 1200 to a network, and an input/output (I/O) interface 1258. The apparatus 1200 can operate the operation system stored in the memory 1232, for example, Windows Server™, Mac OS X™, Unix™, Linux™, Free BSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A smart device grouping system, comprising: a grouping terminal and at least two smart devices selected by the grouping terminal, wherein
    the grouping terminal is configured to send a transmission power value to each of the selected smart devices and instruct each of the selected smart devices to broadcast a signal according the transmission power value;
    each of the selected smart devices is configured to:
        broadcast a signal based on the transmission power value while receiving signals broadcast by other smart devices based on the transmission power value, and
        generate signal strength information respectively based on signal strengths of the received signals and identifications of the selected smart devices sending the received signals; and
    the grouping terminal is further configured to acquire the signal strength information generated by each smart device and group the selected smart devices based on pieces of signal strength information.

2. The system of claim 1, wherein each signal strength information further includes an identification of the smart device that generates the signal strength information, and
    the grouping terminal is further configured to: acquire identifications included in the pieces of signal strength information; select one or more pieces of signal strength information, so that the selected pieces of signal strength information include different identifications; group the selected pieces of signal strength information based on signal strengths included in the selected pieces of signal strength information, an absolute value of a difference between the signal strengths included in each group of pieces of signal strength information being less than a predetermined difference threshold; and acquire corresponding identifications included in each group of pieces of signal strength information, and determine the smart devices having the corresponding identifications as belonging to one group.

3. The system of claim 1, wherein the grouping terminal is further configured to:
acquire types of smart devices in each group, and group the same type of smart devices in the group into a sub-group, wherein the type is a smart electric lamp type or a smart socket type.

4. A smart device grouping method, comprising:
sending a transmission power value to one or more smart devices and instruct the one or more smart devices to broadcast a signal according the transmission power value;
broadcasting, by the smart devices, signals based on the transmission power value while receiving signals broadcast by other smart devices based on the transmission power value;
acquiring pieces of signal strength information fed back by the smart devices, wherein the pieces of signal strength information comprise signal strengths of received signals and identifications of the smart devices sending the received signals; and
grouping the smart devices according to the pieces of signal strength information fed back by the smart devices.

5. The method of claim 4, wherein at least one signal strength information further includes an identification of the smart device which generates the signal strength information, and wherein grouping the smart devices according to the pieces of signal strength information fed back by the smart devices comprises:
acquiring identifications in the pieces of signal strength information;
selecting one or more pieces of signal strength information, so that the selected pieces of signal strength information include different identifications;
grouping the selected pieces of signal strength information based on signal strengths included in the selected pieces of signal strength information, an absolute value of a difference between the signal strengths included in each group of pieces of signal strength information being less than a predetermined difference threshold; and
acquiring corresponding identifications in each group of pieces of signal strength information, and dividing the smart devices having the corresponding identifications into one group.

6. The method of claim 5, further comprising:
acquiring types of smart devices in the group, wherein the types comprise a smart electric lamp type and a smart socket type; and
grouping the same type of smart devices in the group into a sub-group.

7. The method of claim 4, further comprising:
selecting smart devices bound to the same user account as the one or more smart devices; or
selecting smart devices located in the same local area network (LAN) as the one or more smart devices.

8. The method of claim 4, further comprising:
receiving a control instruction for controlling smart devices in a designated group; and
sending the control instruction to the smart devices in the designated group.

9. A smart device grouping method, comprising:
broadcasting, by a smart device, signals based on a transmission power value received from an instruction sent from a grouping terminal while receiving signals broadcast by other smart device based on the transmission power value;
for each signal, generating, by the smart device, a signal strength information based on a received signal strength of the signal and an identification of the other smart device sending the signal; and
sending, by the smart device, the signal strength information generated for the other smart devices to the grouping terminal, to trigger the grouping terminal to group, based on pieces of signal strength information acquired by the grouping terminal, smart devices generating respective sets of pieces of signal strength information.

10. The method of claim 9, further comprising:
receiving a transmission power value sent by the grouping terminal; and
broadcasting a signal based on the transmission power value, the signal carrying an identification of a smart device broadcasting the signal.

11. An apparatus for grouping smart devices, comprising:
a processor and a communication chip controlled by the processor; and
a memory storing instructions executable by the processor,
wherein the processor is configured to:
instruct the communication chip to send a transmission power value to one or more smart devices and instruct the one or more smart devices to broadcast a signal according the transmission power value;
enable the smart devices to broadcast signals based on the transmission power value while receiving signals broadcast by other smart devices based on the transmission power value;
acquire pieces of signal strength information fed back by the smart devices, wherein the pieces of signal strength information comprise signal strengths of received signals and identifications of the smart devices sending the received signals; and
group the smart devices according to the pieces of signal strength information fed back by the smart devices.

12. The apparatus of claim 11, wherein at least one signal strength information further includes an identification of the smart device that generates the signal strength information, and wherein the processor is further configured to:
acquire identifications in the pieces of signal strength information;
select one or more pieces of signal strength information, so that the selected pieces of signal strength information include different identifications;
group the selected pieces of signal strength information based on signal strengths included in the selected pieces of signal strength information, an absolute value of a difference between the signal strengths included in each group of pieces of signal strength information being less than a predetermined difference threshold; and
acquire identifications included in each group of pieces of signal strength information, and divide the smart devices having the identifications into one group.

13. The apparatus of claim 12, wherein the processor is further configured to:

acquire types of smart devices in the group, the types including a smart electric lamp type and a smart socket type; and group the same type of smart devices in the group into a sub-group.

14. The apparatus of claim 11, wherein the processor is further configured to:

select smart devices bound to the same user account as the one or more smart devices; or select smart devices located in the same local area network (LAN) as the one or more smart devices.

15. The apparatus of claim 11, wherein the processor is further configured to:

receive a control instruction for controlling smart devices in a designated group; and send the control instruction to the smart devices in the designated group.

\* \* \* \* \*